United States Patent
Sharma et al.

(10) Patent No.: US 11,195,245 B2
(45) Date of Patent: Dec. 7, 2021

(54) SYSTEM AND METHOD FOR ALLOCATING VEHICLES IN RIDE-SHARING SYSTEMS

(71) Applicant: ANI TECHNOLOGIES PRIVATE LIMITED, Karnataka (IN)

(72) Inventors: Sunil Sharma, New Delhi (IN); Alok Nigam, Uttar Pradesh (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 799 days.

(21) Appl. No.: 15/954,234

(22) Filed: Apr. 16, 2018

(65) Prior Publication Data

US 2019/0206010 A1  Jul. 4, 2019

(30) Foreign Application Priority Data

Dec. 29, 2017  (IN) .............................. 201741047368

(51) Int. Cl.
| | |
|---|---|
| *G06Q 50/30* | (2012.01) |
| *G06Q 10/02* | (2012.01) |
| *G06Q 10/06* | (2012.01) |
| *G07B 15/02* | (2011.01) |
| *H04M 3/493* | (2006.01) |
| *H04W 4/02* | (2018.01) |

(52) U.S. Cl.
CPC ............. *G06Q 50/30* (2013.01); *G06Q 10/02* (2013.01); *G06Q 10/06315* (2013.01); *G07B 15/02* (2013.01); *H04M 3/4936* (2013.01); *H04W 4/025* (2013.01); *H04M 2242/14* (2013.01); *H04M 2242/18* (2013.01)

(58) Field of Classification Search
CPC .. G06Q 50/30; G06Q 10/02; G06Q 10/06315; G07B 15/02; H04M 2242/14; H04M 2242/18; H04M 3/4936; H04M 2203/1008; H04W 4/025; H04W 4/029; H04W 4/12; H04W 4/42; H04W 4/16
See application file for complete search history.

(56) References Cited

U.S. PATENT DOCUMENTS

| | | | |
|---|---|---|---|
| 2003/0235282 A1* | 12/2003 | Sichelman | ....... G06Q 10/08355 379/201.03 |
| 2004/0153325 A1 | 8/2004 | Magee | |
| 2009/0125340 A1 | 5/2009 | Gosney | |

(Continued)

FOREIGN PATENT DOCUMENTS

| | | | |
|---|---|---|---|
| CN | 110047293 A | * | 7/2019 |
| WO | 2012027781 A1 | | 3/2012 |

*Primary Examiner* — Lisa Hashem
(74) *Attorney, Agent, or Firm* — Chip Law Group (57) ABSTRACT

A method and a system for allocating vehicles to passengers in a ride-sharing system is provided. A passenger utilizes a passenger device to initiate a first phone call for booking a ride. The first phone call is initiated on a phone number associated with a pick-up location of the passenger. The first phone call is automatically disconnected, and a second phone call is established with the passenger device for providing a set of options selectable by the passenger. Based on an option selected by the passenger, a share-ride fare of the ride is communicated to the passenger during the second phone call. Based on the communicated share-ride fare, the passenger confirms the booking for the ride. In response to the confirmation of the booking for the ride, a vehicle is allocated to the passenger.

14 Claims, 4 Drawing Sheets

(56) References Cited

U.S. PATENT DOCUMENTS

| | | |
|---|---|---|
| 2011/0046988 A1 | 2/2011 | Gosney |
| 2012/0203599 A1* | 8/2012 | Choi ..................... G06Q 30/02 |
| | | 705/13 |
| 2016/0247095 A1 | 8/2016 | Scicluna et al. |
| 2019/0171988 A1* | 6/2019 | Kwatra .................. G06N 20/00 |
| 2019/0236742 A1* | 8/2019 | Tomskii ................. G06Q 50/30 |
| 2019/0347580 A1* | 11/2019 | Jiwani ...................... G08G 1/20 |
| 2020/0033148 A1* | 1/2020 | Singh ..................... G06Q 10/02 |
| 2020/0202474 A1* | 6/2020 | Asukai ............. G06Q 10/06315 |
| 2020/0211070 A1* | 7/2020 | Singh ................ G06Q 30/0284 |
| 2020/0226498 A1* | 7/2020 | Jiwani ................... G08G 1/202 |
| 2020/0265348 A1* | 8/2020 | Nimesh ........... G06Q 10/06314 |
| 2020/0265488 A1* | 8/2020 | Dhingra ................. G06Q 10/02 |
| 2020/0356931 A1* | 11/2020 | Ebata ...................... G06F 30/20 |
| 2020/0410405 A1* | 12/2020 | ElShenawy ............ G06Q 10/02 |
| 2021/0027212 A1* | 1/2021 | Gupta .................... G06Q 10/02 |
| 2021/0056656 A1* | 2/2021 | Guan ................. G01C 21/3438 |
| 2021/0073934 A1* | 3/2021 | Bai ........................ G06Q 10/02 |
| 2021/0110717 A1* | 4/2021 | Giusti ..................... G06F 3/044 |

\* cited by examiner

SYSTEM AND METHOD FOR ALLOCATING VEHICLES IN RIDE-SHARING SYSTEMS

CROSS-RELATED APPLICATIONS

This application claims priority of Indian Application Serial No. 201741047368, filed Dec. 29, 2017, the contents of which are incorporated herein by reference.

FIELD OF THE INVENTION

The present invention relates generally to ride-sharing systems, and more particularly, to a method and a system for allocating vehicles to passengers in a ride-sharing system.

BACKGROUND

Generally passengers avail various public and private transportation services for making trips to and from work places, or when the passengers are engaged in their personal activities. In modern cities, vehicle transit systems play an important role by providing on-demand vehicle services to the passengers to travel to their desired destination locations. Although the vehicle transit systems prove to be useful for travelling to the desired destination locations at a desired time, the passengers require access to internet services for booking vehicles for their rides.

Conventionally, a vehicle transit system provides an online platform to initiate a request for a ride by a passenger. For instance, the passenger sends a booking request for the ride by means of the online platform, and provides ride-related information, such as a pick-up location, a drop-off location, a time of the ride, a vehicle type, or the like. Based on the booking request, the vehicle transit system allocates a vehicle to the passenger for the ride. However, since the vehicle services are managed in an online manner, there are few challenges for booking the vehicles for the rides. Firstly, the passengers are unable to book the vehicles for their rides due to unavailability of the internet services. The passengers require a steady internet connectivity to initiate the online booking of the vehicles for their rides. However, in many geographical areas, the internet connectivity is unavailable (or has poor connectivity) due to various reasons, such as geographical features, climatic conditions, or the like. Secondly, the passengers are required to have their own smart electronic devices, such as smartphones, on which a service application should be installed to book the vehicles for their rides in the online manner. However, there are segments of passengers who do not own the smart electronic devices, and hence, such segments of passengers are unable to book the vehicles for their rides. Furthermore, there are other passengers who may have smart electronic devices with internet connectivity in their geographical areas, but are unable to book the vehicles for their rides due to lack of prerequisite skills. Hence, such passengers are unable to avail the vehicle services provided by the vehicle transit systems for making the trips to their desired destination locations, which may bring in discomforts during their planned or unplanned trips.

In light of the foregoing, there exists a need for a technical and more reliable solution that solves the above-mentioned problems and manages the allocation of the vehicles to the passengers along a fixed route in a ride-sharing system, thereby, ensuring increased comfort levels to the passengers by providing the vehicle services to the passengers, who are unable to book the vehicles in the online manner.

SUMMARY

Various embodiments of the present invention provide a method and a system for allocating a vehicle to a passenger in a geographical location in a ride-sharing system. The vehicle is a share-ride vehicle operating on a defined route associated with the geographical location. The defined route includes a set of locations including a set of pick-up and drop-off locations. In an embodiment, the method includes one or more operations that are executed by circuitry of the system to allocate the vehicle to the passenger. The circuitry receives a first phone call from a passenger device of the passenger in the geographical location over a communication network. The passenger initiates the first phone call for booking a ride, by means of the passenger device on a phone number associated with the geographical location. After receiving the first phone call, the circuitry executes an automatic disconnection of the first phone call. The circuitry establishes a second phone call in response to the disconnected first phone call. The second phone call is established with the passenger device over the communication network. The second phone call is an Interactive Voice Response (IVR) call for providing a set of options selectable by the passenger. The circuitry receives a first response from the passenger device indicating an option selected by the passenger from the set of options during the second phone call. The selected option may indicate a pick-up or drop-off location of the passenger from the set of pick-up and drop-off locations. The circuitry further communicates a share-ride fare of the requested ride based on the first response during the second phone call. The circuitry receives a second response indicating a confirmation of the booking for the ride by the passenger. The second response is received from the passenger device based on the communicated share-ride fare during the second phone call. Based on the confirmation by the passenger, the circuitry allocates the vehicle to the passenger for the ride.

After the allocation of the vehicle to the passenger, the circuitry transmits an allocation message to the passenger device over the communication network. The allocation message includes booking information of the ride, for example, vehicle information, driver information, or a code associated with the booking of the ride. The circuitry may further receive a third phone call from the passenger device for canceling or modifying the booked ride.

Thus, the method and the system of the present invention provide a choice to the passenger for booking the vehicle for the ride along the defined route by means of a phone call on a phone number associated with the current geographical location of the passenger. Further, the method and the system of the present invention provide a choice to the passenger for cancelling or modifying the booked ride by means of another phone call on the phone number. Thus, the booking of the vehicle for the ride, or cancelling or modifying the booked ride by means of phone calls provides improved booking experience to the passenger in the ride-sharing system.

BRIEF DESCRIPTION OF THE DRAWINGS

The accompanying drawings illustrate the various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Further areas of applicability of the present invention will become apparent from the detailed description provided hereinafter. It should be understood that the detailed description of exemplary embodiments is intended for illustration purposes only and is, therefore, not intended to necessarily limit the scope of the invention.

DETAILED DESCRIPTION

As used in the specification and claims, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present invention. There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components, which constitutes systems and methods for allocating vehicles to passengers in a ride-sharing system. Accordingly, the components and the method steps have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

A vehicle is a means of transport that is deployed by a vehicle transit system, such as a vehicle service provider, to provide vehicle services to passengers. For example, the vehicle is an automobile, a bus, a car, a bike, or the like. The passengers may travel in the vehicle to commute between source and destination locations. Hereinafter, various methods of providing the vehicle services to the passengers by the vehicle transit system have been described that will become apparent to a person having ordinary skill in the relevant art.

Figure 1:
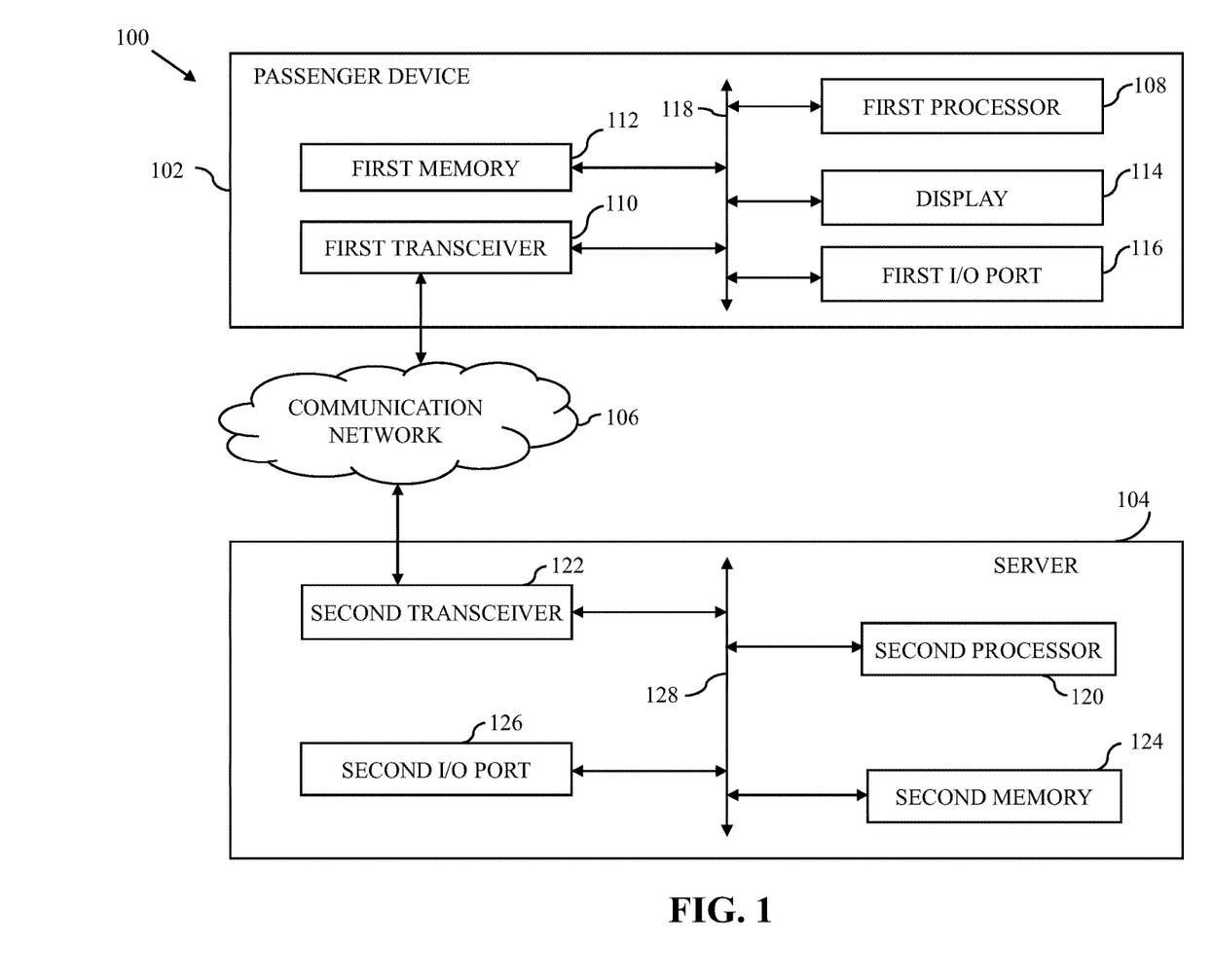
FIG. 1 is a block diagram that illustrates an environment in which various embodiments of the present invention are practiced.

Referring now to FIG. 1, a block diagram that illustrates an environment 100 in which various embodiments of the present invention are practiced. The environment 100 includes a passenger device 102 and a server 104 that communicate with each other by way of a communication network 106. Examples of the communication network 106 include, but are not limited to, a wireless fidelity (Wi-Fi) network, a light fidelity (Li-Fi) network, a satellite network, the Internet, a mobile network such as a cellular data network, a high-speed packet access (HSPA) network, or any combination thereof.

The passenger device 102 is a computing device that is utilized by a passenger in a geographical location to perform one or more activities, including initiating a first phone call for booking a ride. For example, the passenger may initiate the first phone call on a phone number associated with the geographical location that is automatically disconnected by the server 104. Further, in a response to the disconnected first phone call by the server 104, the passenger device 102 receives a second phone call initiated by the server 104 over the communication network 106. The passenger may provide an input to pick-up the second phone call, and provides preferences for booking the ride during the second phone call. Examples of the passenger device 102 include, but are not limited to, a mobile phone, a personal computer, a laptop, a tablet computer, and the like. The passenger device 102 may include circuitry such as, a first processor 108, a first transceiver 110, a first memory 112, a display 114, and a first input/output (I/O) port 116 that communicate with each other by way of a first communication bus 118.

The first processor 108 includes suitable logic, circuitry, and/or interfaces that are operable to execute one or more instructions stored in the first memory 112 to perform one or more operations. For example, based on the phone number dialed-in by the passenger for booking the ride, the first processor 108 establishes the first phone call with the server 104 over the communication network 106. The first phone call is automatically disconnected by the server 104. The first processor 108 further receives the second phone call from the server 104 by means of the first transceiver 110 over the communication network 106 that is communicated to the passenger by means of the first I/O port 116. The second phone call is an Interactive Voice Response (IVR) call. During the second phone call, the passenger provides a first response to select an option from a set of options. The option is selected to provide a drop-off location for the ride. In response to the option selected by the passenger, the first processor 108 receives a share-ride fare for the requested ride from the server 104 that is communicated to the passenger by means of the first I/O port 116. The first processor 108 transmits a second response provided by the passenger to the server 104. The second response indicates a confirmation of the booking for the ride by the passenger based on the communicated share-ride fare. Further, the first processor 108 receives an allocation message including booking information of the ride from the server 104, and stores the allocation message in the first memory 112.

Further, the first processor 108 initiates a third phone call with the server 104 based on the phone number dialed-in by the passenger, when the passenger wants to cancel or modify the booking for the ride. In response to the initiated third phone call, the first processor 108 receives the fourth phone call from the server 104. The fourth phone call is an IVR call. During the fourth phone call, the passenger provides a third response to cancel or modify the booked ride. Examples of the first processor 108 include, but are not limited to, an application-specific integrated circuit (ASIC) processor, a reduced instruction set computing (RISC) processor, a complex instruction set computing (CISC) processor, or a field-programmable gate array (FPGA). It will be apparent to a person skilled in the art that the first processor 108 is compatible with multiple operating systems. It will further be apparent that the first processor 108 may be compatible with multiple displays, for example, the display 114.

The first transceiver 110 includes suitable logic, circuitry, and/or interfaces that are operable to transmit (or receive) data to (or from) various devices, such as the server 104 over the communication network 106. For example, the first transceiver 110 transmits a request for establishing the first or third phone call with the server 104 under the control of the first processor 108. The first transceiver 110 receives the second or fourth phone call from the server 104. The first transceiver 110 transmits the first, second, or third response provided by the passenger to the server 104. The first transceiver 110 receives the share-ride fare or the allocation message of the requested ride from the server 104. Examples of the first transceiver 110 include, but are not limited to, an antenna, a radio frequency transceiver, a wireless transceiver, and a Bluetooth transceiver. The first transceiver 110 communicates with the communication network 106, the first processor 108, and the server 104 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The first memory 112 includes suitable logic, circuitry, and/or interfaces to store the one or more instructions that are executed by the first processor 108 to perform the one or more operations. The first memory 112 stores the phone number dialed-in by the passenger. The first memory 112 stores the allocation message received from the server 104. Examples of the first memory 112 include, but are not limited to, a random access memory (RAM), a read-only memory (ROM), a programmable ROM (PROM), and an erasable PROM (EPROM).

The display 114 includes suitable logic, circuitry, and/or interfaces that are operable to execute one or more instructions stored in the first memory 112 to perform one or more operations. For example, the display 114 presents a user interface for displaying the allocation message based on an input provided by the passenger by means of the first I/O port 116. Examples of the display 114 include, but are not limited to, a Thin-Film-Transistor (TFT) Liquid-Crystal Display (LCD), an In-Plane Switching (IPS) LCD, a Resistive Touchscreen LCD, a Capacitive Touchscreen LCD, an Organic Light Emitting Diode (OLED) display, an Active-Matrix Organic Light-Emitting Diode (AMOLED) display, a Super AMOLED display, a Retina Display, Haptic/Tactile touchscreen, and Gorilla Glass.

The first I/O port 116 includes suitable logic, circuitry, and/or interfaces that are operable to execute one or more instructions stored in the first memory 112 to perform one or more operations. The first I/O port 116 may include input and output devices that are configured to operate under the control of the first processor 108 by way of the first communication bus 118. For example, by means of the first I/O port 116, the passenger provides inputs to perform the one or more operations. For example, the passenger may provide the inputs to dial-in the phone number for initiating the first or third phone call with the server 104. Further, the passenger may provide the inputs corresponding to the first, second, or third response. The inputs may be touch-based inputs, voice-based inputs, gesture-based inputs, or any combination thereof. Examples of the input devices may include a universal serial bus (USB) port, an Ethernet port, a real or virtual keyboard, a mouse, a joystick, a touch screen, a stylus, a microphone, and the like. Examples of the output devices may include a speaker, headphones, a universal serial bus (USB) port, an Ethernet port, and the like.

The server 104 is a computing device, a software framework, or a combination thereof, that may provide a generalized approach to create an application server implementation. In an embodiment, the operation of the server 104 may be dedicated to execution of procedures, such as, but not limited to, programs, routines, or scripts stored in one or more memories for supporting its applied applications. Examples of the server 104 include, but are not limited to, a personal computer, a laptop, or a network of computer systems. The server 104 may be realized through various web-based technologies such as, but are not limited to, a Java web-framework, a .NET framework, a PHP framework, or any other web-application framework. The server 104 may include circuitry such as, a second processor 120, a second transceiver 122, a second memory 124, and a second I/O port 126 that communicate with each other by way of a second communication bus 128.

The second processor 120 includes suitable logic, circuitry, and/or interfaces that are operable to execute one or more instructions stored in the second memory 124 to perform one or more operations. For example, the second processor 120 receives the first phone call from the first processor 108 by way of the second transceiver 122 over the communication network 106. The second processor 120 automatically disconnects the first phone call. The second processor 120 determines the pick-up location of the passenger based on the first phone call. The first phone call is on the phone number associated with the pick-up location in the geographical location. The second processor 120 determines the pick-up location of the passenger based on the phone number of the first phone call. For example, the phone number for the pick-up location "ABC" in the geographical location "PQR" is "2259867825". When the first phone call initiated by the passenger is on the phone number "2259867825", then the second processor 120 determines the pick-up location "ABC" as the pick-up location of the passenger.

Further, the second processor 120 identifies a phone number of the passenger based on the first phone call. The second processor 120 establishes the second phone call with the passenger device 102 based on the phone number of the passenger. After the second phone call has been picked-up by the passenger, the second processor 120 communicates the set of options to the passenger over the second phone call. The set of options includes options corresponding to a set of drop-off locations of the defined route from the pick-up location of the passenger. The second processor 120 receives the first response from the first transceiver 110 by way of the second transceiver 122 over the communication network 106. The first response may be received in response to the option selected by the passenger from the set of options during the second phone call. Based on the first response, the second processor 120 identifies the drop-off location of the passenger. The second processor 120 further determines the share-ride fare of the ride based on the pick-up and drop-off locations of the passenger. In an embodiment, the share-ride fare may be a fixed fare based on a distance between the pick-up and drop-off locations of the passenger. In another embodiment, the share-ride fare may be a fare that is dynamically updated based on an estimated travel time from the pick-up location to the drop-off location. The travel time may be estimated based on current traffic conditions between the pick-up and drop-off locations. In another embodiment, the share-ride fare may be a combination of the fixed and dynamic fares. After determining the share-ride fare, the second processor 120 communicates the share-ride fare of the requested ride to the passenger over the second phone call.

The second processor 120 receives the second response from the first transceiver 110 by way of the second transceiver 122 over the communication network 106. Based on the second response, the second processor 120 allocates the vehicle to the passenger. The vehicle is traversing in a direction of the drop-off location of the passenger along the defined route. Further, the vehicle may be at the pick-up location of the passenger or will reach the pick-up location after a time interval. In an embodiment, the allocated vehicle may be the share-ride vehicle that is nearest to the pick-up location of the passenger. In another embodiment, the allocated vehicle is the share-ride vehicle that may reach the pick-up location of the passenger at a time stamp (for example, "10 AM") specified by the passenger during the second phone call. After allocating the vehicle to the passenger, the second processor 120 transmits the allocation message to the first transceiver 110 by way of the second transceiver 122 over the communication network 106. The allocation message includes the booking information of the ride that may include at least one of a code, an identity name of a driver of the allocated vehicle, a vehicle identification number of the allocated vehicle, a current status of the allocated vehicle, or an expected time of arrival at the pick-up location. The code is a one-time password (OTP) code that can be used by the passenger to authenticate the ride. For example, the passenger may provide the code to the driver of the allocated vehicle, and thereafter, the passenger may board the allocated vehicle for the ride after successful validation of the code.

Further, the second processor 120 receives the third phone call from the passenger device 102. In response to the third phone call, the second processor 120 establishes the fourth phone call with the passenger device 102 over the communication network 106. Examples of the second processor 120 include, but are not limited to, an ASIC processor, a RISC processor, a CISC processor, or a FPGA. It will be apparent to a person skilled in the art that the second processor 120 is compatible with multiple operating systems.

The second transceiver 122 includes suitable logic, circuitry, and/or interfaces that are operable to transmit (or receive) data to (or from) various devices, such as the first transceiver 110 over the communication network 106. For example, the second transceiver 122 receives the first or third phone call from the passenger device 102. The second transceiver 122 further transmits a request for establishing the second or fourth phone call with the passenger device 102. The second transceiver 122 transmits the set of options, and receives the first response from the first transceiver 110 based on the selected option by the passenger during the second phone call. The second transceiver 122 transmits the share-ride fare to the first transceiver 110, and receives the second response. The second transceiver 122 further transmits the allocation message to the first transceiver 110. Examples of the second transceiver 122 include, but are not limited to, an antenna, a radio frequency transceiver, a wireless transceiver, and a Bluetooth transceiver. The second transceiver 122 communicates with the communication network 106, the second processor 120, and the first transceiver 110 using various wired and wireless communication protocols, such as TCP/IP (Transmission Control Protocol/Internet Protocol), UDP (User Datagram Protocol), $2^{nd}$ Generation (2G), $3^{rd}$ Generation (3G), $4^{th}$ Generation (4G) communication protocols, or any combination thereof.

The second memory 124 includes suitable logic, circuitry, and/or interfaces to store the one or more instruction that are executed by the second processor 120 to perform the one or more operations. In an embodiment, the second memory 124 stores a first look-up table including phone numbers associated with pick-up locations of the defined route. Further, the second memory 124 stores a second look-up table including the set of pick-up or drop-off locations corresponding to each of the one or more pick-up locations. The second memory 124 further stores a third look-up table including the share-ride fare for each combination of pick-up and drop-off locations along the defined route. Further, the second memory 124 stores a fourth look-up table including a list of share-ride vehicles that operate along the defined route of the geographical location. The second memory 124 further stores the allocation message of the allocated vehicle to the passenger. Examples of the second memory 124 include, but are not limited to, a RAM, a ROM, a PROM, and an EPROM.

The second I/O port 126 includes suitable logic, circuitry, and/or interfaces that are operable to execute one or more instructions stored in the second memory 124 to perform one or more operations. The second I/O port 126 may include various input and output devices that are configured to operate under the control of the second processor 120 by way of the second communication bus 128. For example, by means of the second I/O port 126, an administrator associated with the server 104 provides one or more inputs to perform the one or more operations. Examples of the input devices may include a universal serial bus (USB) port, an Ethernet port, a real or virtual keyboard, a mouse, a joystick, a touch screen, a stylus, a microphone, and the like. Examples of the output devices may include a display screen, a speaker, headphones, a universal serial bus (USB) port, an Ethernet port, and the like.

Figure 2:
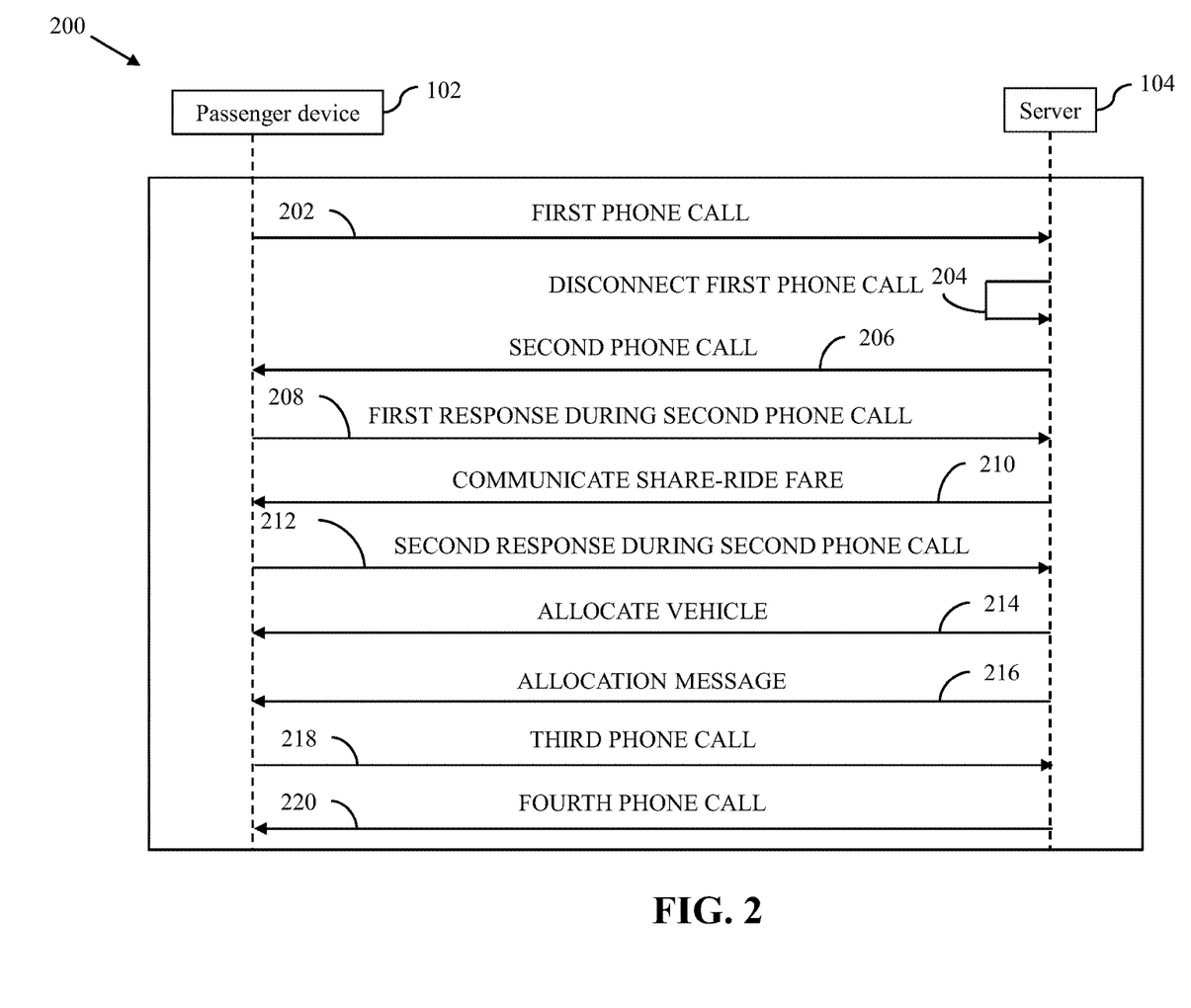
FIG. 2 is a timing diagram that illustrates communication between a passenger device and a server of the environment of FIG. 1, in accordance with an embodiment of the present invention.

Referring now to FIG. 2, a timing diagram 200 that illustrates the communication between the passenger device 102 and the server 104 of FIG. 1 is shown, in accordance with an embodiment of the present invention. At 202, the passenger initiates the first phone call with the server 104 for booking the ride using the passenger device 102 over the communication network 106. To book the ride, the passenger initiates the first phone call on the phone number associated with the pick-up location of the passenger in the geographical location. At 204, the server 104 disconnects the first phone call. Further, the server 104 determines the pick-up location and the phone number of the passenger based on the first phone call. At 206, the server 104 establishes the second phone call with the passenger device 102 based on the phone number of the passenger. During the second phone call, the server 104 communicates the set of options corresponding to the set of drop-off locations from the pick-up location of the passenger. At 208, based on the selected option by the passenger, the passenger device 102 transmits the first response to the server 104. The first response indicates the drop-off location selected by the passenger from the set of drop-off locations.

At 210, based on the first response, the server 104 communicates the share-ride fare of the ride to the passenger over the second phone call. At 212, after communicating the share-ride fare of the ride to the passenger, the server 104 receives the second response from the passenger device 102 that indicates the confirmation of the booking of the ride based on the communicated share-ride fare. At 214, the server 104 processes the second response to determine the confirmation of the booking, and allocates the vehicle to the passenger. After allocating the vehicle to the passenger, the server 104 may disconnect the second phone call. Thereafter, at 216, the server 104 transmits the allocation message to the passenger device 102. The allocation message include the booking information of the booked ride. The booking information includes the vehicle information, the driver information, an estimated time of arrival (ETA) of the allocated vehicle at the pick-up location, or the code, for example, the OTP code. The code is used by the passenger to validate and start the booked ride with the allocated vehicle.

At 218, the passenger utilizes the passenger device 102 to establish the third phone call with the server 104. The passenger establishes the third phone call on the phone number associated with the pick-up location of the passenger in the geographical location. The server 104 disconnects the third phone call, and at 220, the server 104 establishes the fourth phone call with the passenger device 102 based on the phone number of the passenger. During the fourth phone call with the passenger, the passenger may provide the inputs to cancel or modify the booking of the ride. For example, during the fourth phone call, the passenger devices 102 transmits the third response provided by the passenger to the server 104. In a scenario when the third response indicates the cancellation of the booked ride, the server 104 cancels the booked ride of the passenger. In another scenario, when the third response indicates a request for connecting to a customer care operator of the vehicle transit system, the server 104 establishes a communication bridge with the customer care operator. In an embodiment, when the passenger has not received the allocation message, the passenger may request the customer care operator to provide the allocation message of the booked ride. In another embodiment, when the passenger is a visually-challenged individual, the passenger may request the customer care operator to provide the allocation message in an audio form, for example, a voice-based allocation message.

Figure 3:
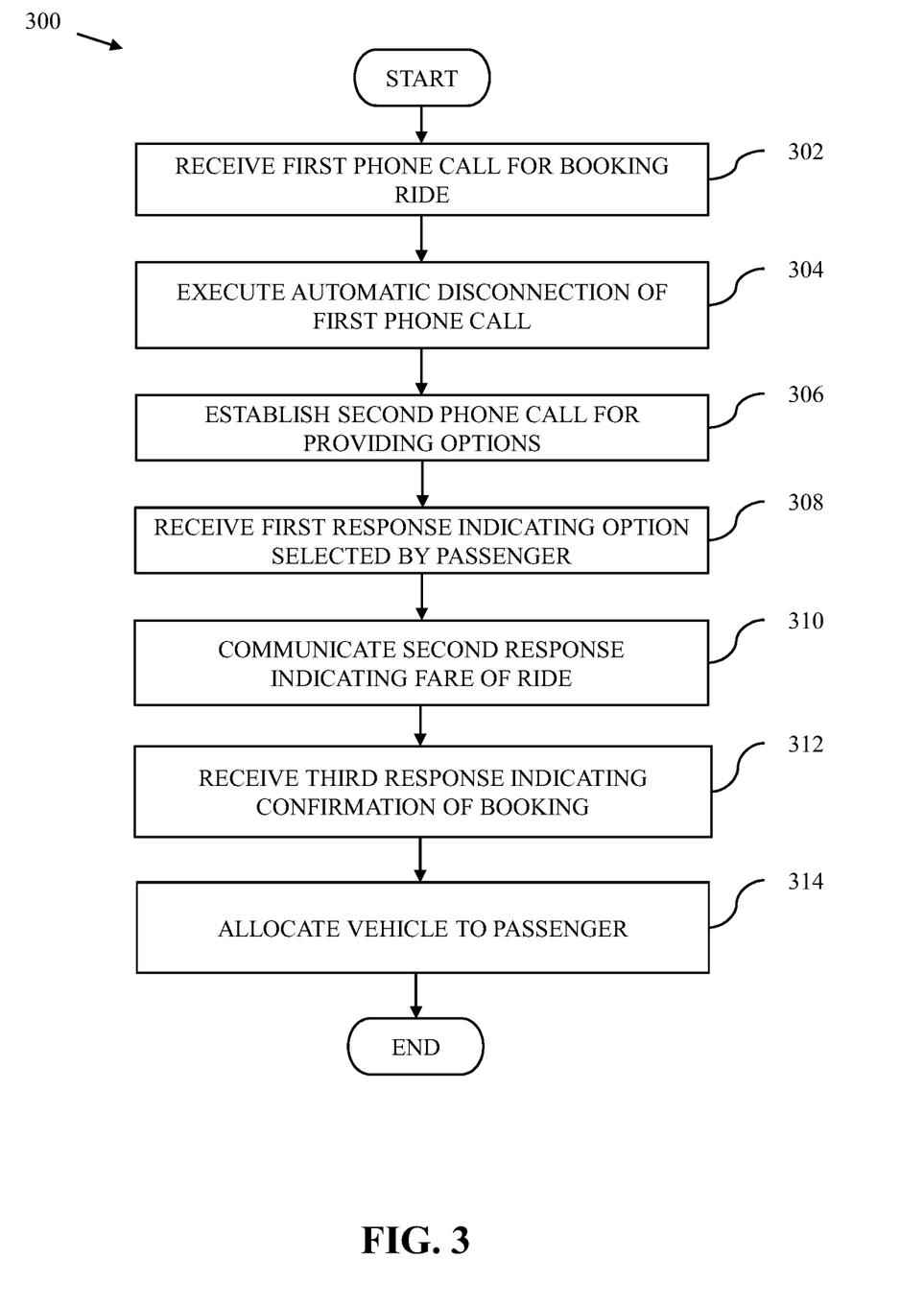
FIG. 3 is a flow chart that illustrates a method for allocating vehicles to passengers in a ride-sharing system, in accordance with an embodiment of the present invention.

Referring now to FIG. 3, a flow chart 300 that illustrates a method for allocating vehicles to passengers in the ride-sharing system is shown, in accordance with an embodiment of the present invention.

At step 302, the server 104 receives the first phone call from the passenger device 102 over the communication network 106 for booking the ride. To book the ride, the passenger initiates the first phone call on the phone number associated with the pick-up location of the passenger in the geographical location.

At step 304, the server 104 disconnects the first phone call. Further, the server 104 determines the phone number of the passenger based on the first phone call. Further, the server 104 determines the pick-up location of the passenger based on the phone number of the first phone call. Further, the server 104 determines the set of drop-off locations associated with the pick-up location.

At step 306, the server 104 establishes the second phone call with the passenger device 102 over the communication network 106. The second phone call is initiated on the phone number of the passenger. The second phone call is the IVR call. After the second phone call is picked-up by the passenger, the server 104 communicates the set of options to the passenger over the second phone call.

At step 308, the server 104 receives the first response from the passenger device 102 during the second phone call. The first response is received in response to the set of options provided by the server 104. The first response indicates the option selected from the first set of options. Based on the first response, the server 104 identifies the drop-off location selected by the passenger.

At step 310, the server 104 determines the share-ride fare based on the pick-up and drop-off locations of the passenger. On determining the share-ride fare, the server 104 communicates the share-ride fare to the passenger over the second phone call.

At step 312, based on the share-ride fare of the ride communicated by the server 104 to the passenger during the second phone call, the server 104 receives the second response passenger transmits the second response from the passenger device 102. The third response indicates the confirmation of the booking of the ride for the communicated share-ride fare. At step 314, based on the second response, the server 104 allocates the vehicle to the passenger.

Figure 4:
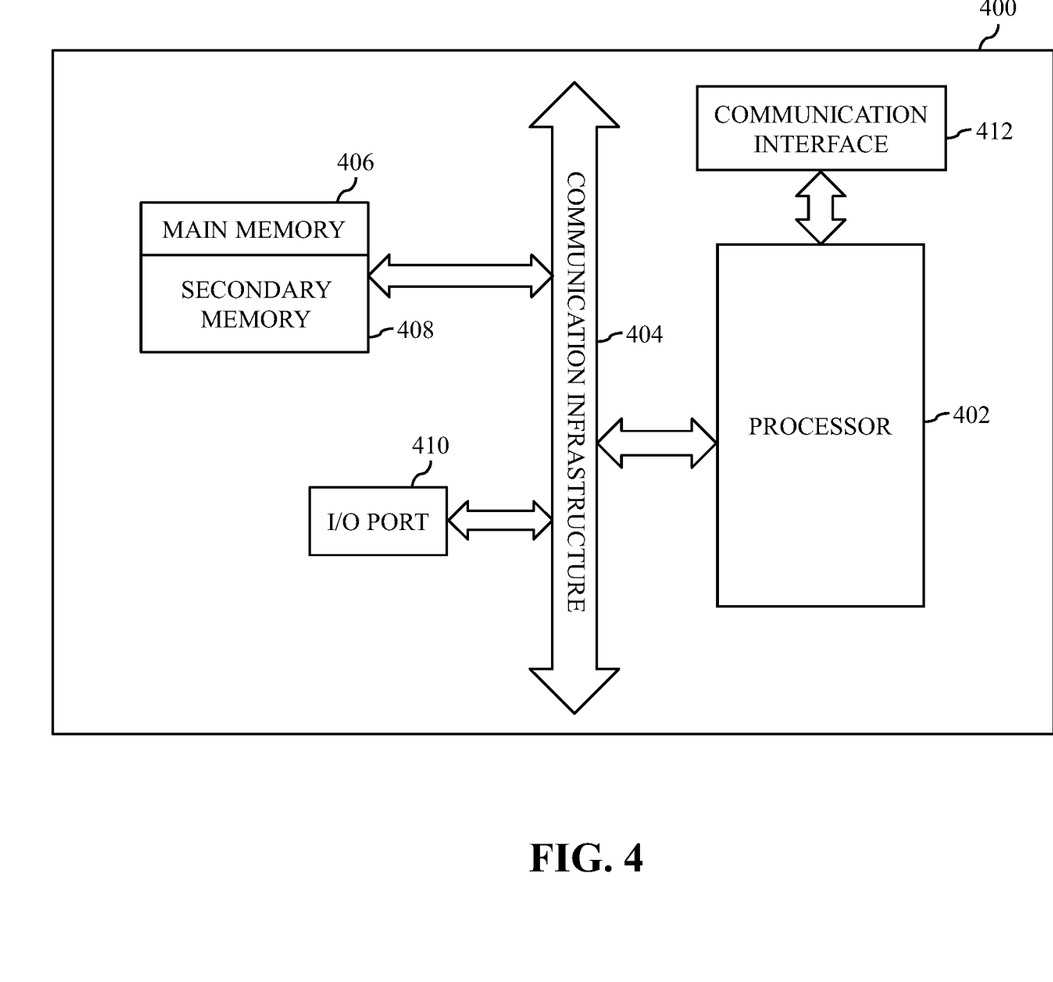
FIG. 4 is a block diagram that illustrates a computer system for allocating vehicles to passengers in a ride-sharing system, in accordance with an embodiment of the present invention.

Referring now to FIG. 4, a block diagram that illustrates a computer system 400 for allocating vehicles to passengers in ride-sharing system is shown, in accordance with an embodiment of the present invention. An embodiment of the present invention, or portions thereof, may be implemented as computer readable code on the computer system 400. In one example, the server 104 of FIG. 1 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIG. 3.

The computer system 400 includes a processor 402 that may be a special purpose or a general purpose processing device. The processor 402 may be a single processor, multiple processors, or combinations thereof. The processor 402 may have one or more processor "cores." Further, the processor 402 may be connected to a communication infrastructure 404, such as a bus, a bridge, a message queue, the communication network 106, multi-core message-passing scheme, and the like. The computer system 400 further includes a main memory 406 and a secondary memory 408. Examples of the main memory 406 may include random access memory (RAM), read-only memory (ROM), and the like. The secondary memory 408 may include a hard disk drive or a removable storage drive (not shown), such as a floppy disk drive, a magnetic tape drive, a compact disc, an optical disk drive, a flash memory, and the like. Further, the removable storage drive may read from and/or write to a removable storage device in a manner known in the art. In an embodiment, the removable storage unit may be a non-transitory computer readable recording media.

The computer system 400 further includes an input/output (I/O) port 410 and a communication interface 412. The I/O port 410 includes various input and output devices that are configured to communicate with the processor 402. Examples of the input devices may include a keyboard, a mouse, a joystick, a touchscreen, a microphone, and the like. Examples of the output devices may include a display screen, a speaker, headphones, and the like. The communication interface 412 may be configured to allow data to be transferred between the computer system 400 and various devices that are communicatively coupled to the computer system 400. Examples of the communication interface 412 may include a modem, a network interface, i.e., an Ethernet card, a communications port, and the like. Data transferred via the communication interface 412 may be signals, such as electronic, electromagnetic, optical, or other signals as will be apparent to a person skilled in the art. The signals may travel via a communications channel, such as the communication network 106 which may be configured to transmit the signals to the various devices that are communicatively coupled to the computer system 400. Examples of the communication channel may include, but are not limited to, cable, fiber optics, a phone line, a cellular phone link, a radio frequency link, a wireless link, and the like.

Computer program medium and computer usable medium may refer to memories, such as the main memory 406 and the secondary memory 408, which may be a semiconductor memory such as dynamic RAMs. These computer program mediums may provide data that enables the computer system 400 to implement the methods illustrated in FIG. 3. In an embodiment, the present invention is implemented using a computer implemented application. The computer implemented application may be stored in a computer program product and loaded into the computer system 400 using the removable storage drive or the hard disc drive in the secondary memory 408, the I/O port 410, or the communication interface 412.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor, such as the processor 402, and a memory, such as the main memory 406 and the secondary memory 408, implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present invention provide, among other features, systems and methods for allocating the vehicles to the passengers in a geographical location by means of phone calls on phone numbers associated with pick-up locations of the geographical location. Unless stated otherwise, terms such as "first" and "second" are used to arbitrarily distinguish between the elements such terms describe. Thus, these terms are not necessarily intended to indicate temporal or other prioritization of such elements. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A vehicle allocation method, comprising:
   receiving, by a server from a passenger device of a passenger in a geographical location over a communication network, a first phone call for booking a ride, wherein the first phone call is initiated by the passenger via the passenger device on a phone number associated with a pick-up location of the passenger in the geographical location;
   executing, by the server, an automatic disconnection of the first phone call;
   establishing, by the server with the passenger device over the communication network, a second phone call in response to the disconnected first phone call, wherein the second phone call is an Interactive Voice Response (IVR) call for providing a set of options selectable by the passenger;
   receiving, by the server from the passenger device, a first response indicating an option selected by the passenger from the set of options during the second phone call;
   communicating, by the server to the passenger during the second phone call, a second response indicating a share-ride fare of the ride based on the first response;
   receiving, by the server from the passenger device, a third response indicating a confirmation of the booking for the ride based on the communicated share-ride fare_in the second response; and
   allocating, by the server, a vehicle to the passenger for the ride based on the third response.

2. The method of claim 1, further comprising transmitting, by the server to the passenger device over the communication network, an allocation message including booking information of the ride, wherein the booking information comprises at least one of vehicle information, driver information, or a code associated with the booking of the ride.

3. The method of claim 2, further comprising receiving, by the server from the passenger device of the passenger in the geographical location over the communication network, a third phone call for canceling or modifying the booking of the ride.

4. The method of claim 1, wherein the vehicle is a share-ride vehicle operating on a defined route associated with at least the geographical location.

5. The method of claim 4, wherein the defined route comprises a set of locations including a set of pick-up locations and a set of drop-off locations, and wherein each pick-up location of the set of pick-up locations is associated with one or more drop-off locations of the set of drop-off locations, and wherein the set of pick-up locations include the pick-up location in the geographical location.

6. The method of claim 5, wherein the set of options provided in the second phone call includes the one or more drop-off locations associated with the pick-up location.

7. The method of claim 1, further comprising identifying, by the server, a drop-off location for the ride based on the first response received during the second phone call.

8. The method of claim 7, further comprising determining, by the server, the share-ride fare during the second phone call based on the identification of the drop-off location.

9. A vehicle allocation system, comprising:
    circuitry configured to:
        receive, a first phone call from a passenger device of a passenger over a communication network to book a ride, wherein the first phone call is initiated by the passenger in a geographical location via the passenger device on a phone number associated with a pick-up location in the geographical location;
        execute an automatic disconnection of the first phone call;
        establish a second phone call in response to the disconnected first phone call, wherein the second phone call is an Interactive Voice Response (IVR) call to provide a set of options selectable by the passenger;
        receive a first response that is indicative of an option selected by the passenger from the set of options during the second phone call;
        communicate, to the passenger during the second phone call, a second response that is indicative of a share-ride fare of the ride based on the first response;
        receive, from the passenger device, a third response that is indicative of a confirmation of the booking for the ride based on the communicated share-ride fare in the second response; and
        allocate a vehicle to the passenger for the ride based on the third response.

10. The system of claim 9, wherein the circuitry is further configured to transmit to the passenger device over the communication network, an allocation message that includes booking information of the ride, wherein the booking information comprises at least one of vehicle information, driver information, or a code associated with the booking of the ride.

11. The system of claim 10, wherein the circuitry is further configured to receive from the passenger device of the passenger in the geographical location over the communication network, a third phone call to cancel or modify the booking of the ride.

12. The system of claim 9, wherein the vehicle is a share-ride vehicle that operates on a defined route associated with at least the geographical location.

13. The system of claim 12, wherein the defined route comprises a set of locations including a set of pick-up locations and a set of drop-off locations, and wherein each pick-up location of the set of pick-up locations is associated with one or more drop-off locations of the set of drop-off locations, and wherein the set of pick-up locations include the pick-up location in the geographical location.

14. The system of claim 13, wherein the set of options provided in the second phone call includes the one or more drop-off locations associated with the pick-up location.

* * * * *